United States Patent [19]

Murphy et al.

[11] Patent Number: 4,519,626
[45] Date of Patent: May 28, 1985

[54] ADJUSTABLE MOUNTING FOR STEERABLE WHEELS

[75] Inventors: Richard D. Murphy, Birmingham, Mich.; Marvin N. Sokulsky, Windsor, Canada

[73] Assignee: Ford Motor Company, Dearborn, Mich.

[21] Appl. No.: 487,235

[22] Filed: Apr. 26, 1983

Related U.S. Application Data

[63] Continuation of Ser. No. 215,473, Dec. 11, 1980, abandoned.

[51] Int. Cl.³ .............................................. B62D 17/00
[52] U.S. Cl. ..................... 280/661; 403/162; 403/DIG. 8
[58] Field of Search ............... 280/661, 96.1; 215/475; 403/161, 162, DIG. 7, DIG. 8

[56] References Cited

U.S. PATENT DOCUMENTS

| | | | |
|---|---|---|---|
| 2,674,465 | 4/1954 | Carpezzi | 280/661 |
| 3,147,025 | 9/1964 | Good | 280/661 |
| 3,563,564 | 2/1971 | Bartkowiak | 280/96.1 |
| 3,880,444 | 4/1975 | Bridges | 280/661 |
| 3,887,211 | 6/1975 | Mazur | 280/95 R |
| 3,999,779 | 12/1976 | Bishop | 280/661 |
| 4,026,578 | 5/1977 | Mattson | 280/661 |
| 4,030,737 | 6/1977 | Bridges | 280/661 |
| 4,037,680 | 7/1977 | Grove | 280/661 |
| 4,232,880 | 11/1980 | Dickerson | 280/661 |

OTHER PUBLICATIONS

Ford 1977 Car Shop Manual, vol. 1, Chassis, p. 14-03-3.

Primary Examiner—Bruce H. Stoner, Jr.
Assistant Examiner—John A. Carroll
Attorney, Agent, or Firm—Jerome R. Drouillard; Roger L. May

[57] ABSTRACT

An adjustable mounting assembly has a slot through the control arm of a steerable wheel suspension system in which a threaded stud of a ball joint extends. Nuts threadably engage the stud and clamp the control arm in place to fix the spindle in an adjusted position. The nuts are longitudinally adjusted along the stud to preload the ball joint to a desired amount.

1 Claim, 5 Drawing Figures

ADJUSTABLE MOUNTING FOR STEERABLE WHEELS

This application is a continuation of application Ser. No. 215,473, filed Dec. 11, 1980, now abandoned.

BACKGROUND OF THE INVENTION

1. Field of the Invention

This invention relates to adjustable mounts for steerable wheels, more particular to camber and caster adjusters for motor vehicle wheels.

2. Disclosure Information

Ball joints have long been used in automobiles to provide for rotatable motion between the spindle and control arms of a motor vehicle. Adjustments are often needed between the spindle and control arms to provide for the proper camber and caster. One of the more common ways of providing this adjustment is to provide an eccentric member which, when rotated, changes the relative position of the spindle with respect to the control arms. In another known construction, the ball joint has a ball stud with an eccentric shank which when rotated relatively moves the eccentric shank and its connected arm with respect to the ball and its connected arm.

In addition, another common way to provide adjustment is with a sleeve surrounding the ball stud having an eccentrically placed hole therethrough. When the sleeve is rotated, it adjustably positions the ball stud.

The problems with the previous designs are twofold. Firstly, often times the camber of a vehicle cannot be adjusted without also affecting the caster. In addition, if the camber or caster is to be adjusted without affecting the other, the adjustment is limited to usually just two positions. There is no range of adjustability. It is desirous to have an adjustment device that allows varied adjustment within a range and also the ability to adjust one of the camber or caster without affecting the other.

SUMMARY OF THE DISCLOSURE

According to the invention, an adjustment means or assembly is constructed for use with a steerable wheel assembly of a motor vehicle for controlling the camber or caster of the wheel assembly. The invention is particular adaptable to an independent front suspension in which a wheel support member or spindle is positioned in part by a suspension or control arm. The adjustable assembly interconnects the control arm and the spindle. In one presently preferred construction, the assembly incorporates a slot in the control arm with the stud of a ball joint extending through the slot and being clamped at a longitudinal point along said slot to the arm.

Further, according to the invention, the fasteners which clamp the stud to the slotted arm are constructed for putting an adjustable preload on the ball joint.

BRIEF DESCRIPTION OF THE DRAWINGS

Reference now will be made to the accompanying drawings, in which.

DETAILED DESCRIPTION OF THE PREFERRED EMBODIMENT

Figure 1:
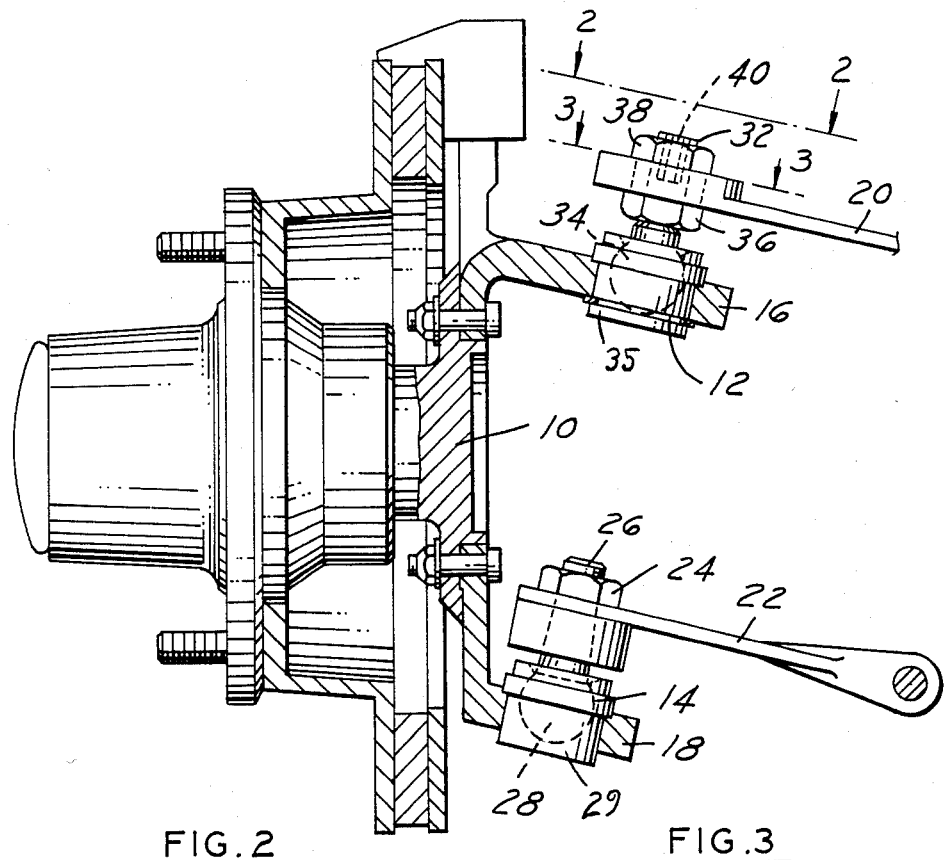
FIG. 1 is a partially segmented front elevational view of a steerable wheel assembly which illustrates one embodiment of the invention.

Referring particularly to FIG. 1, a wheel spindle 10 constructed to rotatably support wheel hub 11 has an upper arm 16 and lower arm 18. The arms 16 and 18 are mounted through ball joints 12 and 14 respectively to suspension or control arms 20 and 22 respectively. The lower control arm 22 is secured to the ball joint 14 in a conventional fashion by a nut 24 threadably engaging a stud 26 which is integral with the ball 28 housed in socket housing 29.

Figure 3:
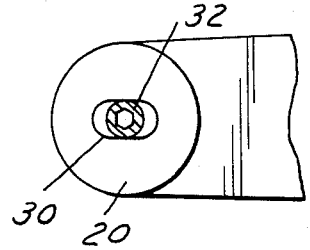
FIG. 3 is a sectional view taken along the line 3—3 in FIG. 1.

The upper control arm 20 is adjustably secured to the spindle arm 16. This adjustable feature is accomplished by a slot 30, clearly shown in FIG. 3, introduced through arm 20. A threaded ball stud 32 has an integral ball 34 housed in socket housing 35 of ball joint 12. The shank of the ball stud 32 is sized to fit through slot 30. A lower nut 36 and a upper nut 38 threadably engage the stud 32 with the arm 20 being clamped therebetween.

The adjustment feature is accomplished by loosening the nut 38 and sliding the stud 32 to a desired position along slot 30 and retightening nut 38 to frictionally clamp the arm 20 with respect to the stud 32. The slot 30 extends transversely of the vehicle; that is, lengthwise of the arm 20. As the stud 32 is positioned along the slot, the camber of the spindle varies.

If an adjustable mounting assembly is desired that changes only the caster, slot 30 can be directed with its major axis parallel to the longitudinal axis of the vehicle; that is, transverse to the control arm 20 rather than aligned lengthwise with control arm 20.

Figure 2:
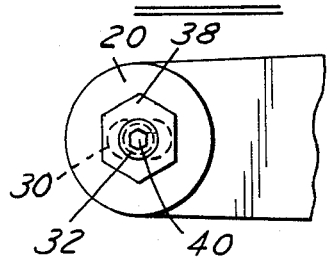
FIG. 2 is a fragmentary plan view of the upper ball joint taken along the line 2—2 in FIG. 1.

In addition, the mounting assembly also can put a preload on the ball joint 12 by adjustment of the height of the control arm 20 with respect to the stud 32. As control arm 20 is moved upward relative to the stud 32 and compresses the suspension spring (not shown), the spring exerts a preload on ball joint 12 in addition to the load exerted by the weight of the vehicle body through the spring. The preload can be adjusted by either of two different methods. One method involves rotating the lower nut 36 to its desired position before tightening the upper nut 38. The second method involves using an Allen wrench inserted into hole 40 in stud 32, as shown in FIG. 2, to turn stud 32 to its vertically adjusted position. The second method can be used if the nut 36 for some reason cannot turn or is abutting the arm 20 and a higher preload is desired.

Figure 4:
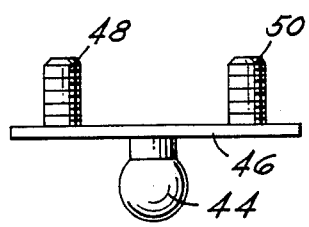
FIG. 4 is a side elevational view of a ball connected to a plate with two threaded studs in accordance with a second embodiment of the present invention.
Figure 5:
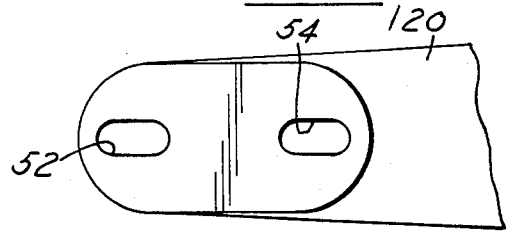
FIG. 5 is a plan view of a modified control arm used with the ball shown in FIG. 4.

A second embodiment of the present invention is disclosed in FIGS. 4 and 5. This construction is intended primarily for heavier vehicles where a larger friction force is needed to lock the spindle arm 16 in its desired position with respect to control arm 20. This embodiment includes a ball 44 illustrated in FIG. 4 which is rigidly secured to a plate 46. Two threaded studs 48 and 50 extend from plate 46 in an opposing direction from the ball 44. The studs 48 and 50 engage slots 52 and 54 in a control arm 120 illustrated in FIG. 5. The control arm 120 is locked to the studs 48 and 50 by threaded nuts in the same fashion as stud 40 in the first embodiment is locked to control arm 20. This second embodiment, by using a plurality of studs and slots, allows for a greater friction force in holding the control arm to the spindle arm while permitting the adjustability feature along the slots 52 and 54.

Other embodiments can incorporate the slot through the spindle arm with the ball joint seated in the control arm. Furthermore, the lower spindle arm and lower control arm can incorporate this novel adjustment mounting assembly rather than the upper arms as shown.

In this fashion, an adjustment mounting assembly is provided that can lock the spindle to the control arm in any desired adjusted position betwween two extremes and in addition can preload the ball joint.

Variations and modifications of the invention can be made without departing from its spirit or scope as defined in the appended claims.

The embodiments in which an exclusive property or privilege is claimed are defined as follows:

1. An adjustable mounting assembly for a steerable vehicle wheel assembly comprising:
   (i) a control arm;
   (ii) a spindle member on which a wheel is mountable and including a spindle arm;
   (iii) a ball joint comprising:
      (a) a ball portion;
      (b) a socket portion attached to one of said control or spindle arms and receiving said ball portion; and
      (c) a plate rigidly secured to said ball portion and having a plurality of studs extending therefrom in a direction opposing said ball portion;
   (iv) a plurality of slots in the other of said control or spindle arms with:
      (a) said slots having a common longitudinal axis generally parallel to the longitudinal axis of the arm containing said slots; and
      (b) said slots receiving said studs extending from said plate, thereby allowing adjustment of the camber of said spindle member as said studs are moved along said longitudinal axis of said slots; and
   (v) means for locking said studs at any desired location along said slots.

* * * * *